United States Patent
Szalwinski

Patent Number: 6,078,933
Date of Patent: Jun. 20, 2000

[54] METHOD AND APPARATUS FOR PARALLEL PROCESSING FOR ARCHIVING AND RETRIEVAL OF DATA

[75] Inventor: Bruce Szalwinski, Austin, Tex.

[73] Assignee: Advanced Micro Devices, Inc., Austin, Tex.

[21] Appl. No.: 09/225,438

[22] Filed: Jan. 5, 1999

[51] Int. Cl.[7] ................................................. G06F 17/30
[52] U.S. Cl. ........................ 707/204; 707/202; 707/203
[58] Field of Search .................................... 707/204, 202, 707/203

[56] References Cited

U.S. PATENT DOCUMENTS

| | | | |
|---|---|---|---|
| 5,155,835 | 10/1992 | Belsan ..................................... | 395/425 |
| 5,276,867 | 1/1994 | Kenley et al. .......................... | 707/204 |
| 5,287,497 | 2/1994 | Behera .................................... | 707/204 |
| 5,513,112 | 4/1996 | Herring et al. ............................ | 707/3 |
| 5,515,502 | 5/1996 | Wood ................................ | 395/182.13 |
| 5,625,816 | 4/1997 | Burdick et al. ......................... | 707/103 |
| 5,649,158 | 7/1997 | Lahr et al. ............................... | 395/488 |
| 5,751,997 | 5/1998 | Kullick et al. .......................... | 707/204 |
| 5,764,972 | 6/1998 | Crouse et al. .......................... | 707/204 |

*Primary Examiner*—Thomas G. Black
*Assistant Examiner*—Frantz Coby
*Attorney, Agent, or Firm*—Williams, Morgan & Amerson, P.C.

[57] ABSTRACT

The present invention provides for a method for archiving data files in a system having a master archiver and a plurality of child archivers. A plurality of child archivers are controlled by coupling the master archiver to each one of the child archivers. The order of at least one manufacturing area is determined to archive data files from the manufacturing area into an archiving destination. An archive protocol file is created for archiving the data file. An archiving process is implemented in response to a specification from the archiving protocol file. A start-up of the archiver process is executed. The child archivers are monitored to determine whether the child archivers have completed the archiving process. A shut-down of the archiving process is executed in response to the determination that the child archivers have completed the archiving process. The archiving process is terminated.

30 Claims, 5 Drawing Sheets

METHOD AND APPARATUS FOR PARALLEL PROCESSING FOR ARCHIVING AND RETRIEVAL OF DATA

BACKGROUND OF THE INVENTION

1. Field of the Invention

This invention relates generally to data management, and, more particularly, to parallel processing of data for archiving and retrieving data.

2. Description of the Related Art

Modern developments in manufacturing processes have brought forth the need for complex and innovative methods of tracking and documenting the many steps involved in such processes. Today's manufacturing processes, particularly semiconductor manufacturing processes, call for a large number of important steps. These process steps are usually very vital; therefore, a large number of data files are generated to properly document their completion.

The manufacture of semiconductor devices requires a number of discrete process steps to create a packaged semiconductor circuit device from raw semiconductor material. The various processes, from the initial melt and refinement of the semiconductor material, the slicing of the semiconductor crystal into individual wafers, the fabrication stages (etching, doping, ion implanting, or the like), to the packaging and final testing of the completed device, are so different from one another and specialized that the processes may be performed in different facilities in remote regions of the globe.

For example, the process of growing and refining a large semiconductor crystal (e.g., Si, GaAs, or the like) may be performed by a foundry specializing in such crystal growth techniques. The resultant crystals may then be sold directly to a semiconductor manufacturer, either as large crystals, or as wafers sliced from a large crystal.

The semiconductor manufacturer may then slice the semiconductor crystal into wafers, if the semiconductor material is not already in wafer format. The semiconductor manufacturer then fabricates semiconductor circuit devices (e.g., microprocessor, DRAM, ASIC, or the like) on individual wafers, usually forming a number of devices on each wafer. The individual fabrication (or "FAB") processes include photolithography, ion implantation, and other associated FAB processes known in the art. Typically, the resultant semiconductor device is tested on the wafer during and after the FAB process.

Once the semiconductor devices have been fabricated and tested on the wafer, the wafer is sliced up into individual semiconductor chips and packaged. The packaging process includes mounting and wire-bonding the individual chips to chip carriers (e.g., PLCCs, DIPs, CER-DIPs, surface mount carriers, or the like) and final testing of the resultant packaged semiconductor device. This packaging process is fairly labor intensive, and thus it may be desirable to perform the mounting, wire-bonding, and final testing at a facility where labor rates may be cheaper. Once completed, the packaged semiconductor device may again be tested, and then labeled and shipped to customers through a distribution system.

One problem that arises in the current manufacturing-data management techniques is that the various processes take place at different discrete locations. Thus, it is difficult to track a semiconductor device through the fabrication process from single crystal to finished product. Such tracking may be useful for quality control purposes to determine the causes of product problems that may result in low yields or circuit defects. Tracking data files that correspond to all of the steps in the fabrication process, and managing those data files, is a very difficult task.

Another problem with current methods of storing data files is that a large amount of resources is required to store, archive, and retrieve data. A more organized manner of performing storage management of data would greatly improve manufacturing processes. Large sections of data could be stored, archived, and retrieved in an efficient manner with such a storage management vehicle. Better data management would improve manufacturing capabilities.

The data storage methods used in the industry presently can cause problems during the storage and archiving process. Often, archiving of data files is performed by a process that generally runs through several manufacturing areas, one after another. Many times, a problem in one of the manufacturing areas can cause the archiving process to inadvertently skip a manufacturing area. Many times, an archiving process may not reach the end of the list of the manufacturing areas that contain files slated for archival. Furthermore, the current archiving process may not be able to finish archiving all of the files from the different manufacturing areas due to a lack of allotted time.

The present invention is directed to overcoming, or at least reducing the effects of, one or more of the problems set forth above.

SUMMARY OF THE INVENTION

In one aspect of the present invention, a method is provided for archiving data files in a system having a master archiver and a plurality of child archivers. A plurality of child archivers is controlled by coupling the master archiver to each one of the child archivers. The order of at least one manufacturing area is determined to archive data files from the manufacturing area into an archiving destination. An archive protocol file is created for archiving the data file. An archiving process is implemented in response to a specification from the archiving protocol file. A start-up of the archiver process is executed. The child archivers are monitored to determine whether the child archivers have completed the archiving process. A shut-down of the archiving process is executed in response to the determination that the child archivers have completed the archiving process. The archiving process is terminated.

In one aspect of the present invention, an apparatus for storing, archiving, and retrieving data is provided. The apparatus described in the present invention comprises: a network for transmitting and receiving data; at least one input system, coupled to the network, for inputting data in at least a first format; a reformatter, coupled to the network, for receiving the data and reformatting the data into a predetermined format to produce reformatted data; a primary database, coupled to the network, for storing the reformatted data; a loader, coupled to the primary database, for loading the reformatted data into the primary database; at least one client workstation, coupled to the network, for receiving data search requests; a front end server, coupled to the network, for receiving the primary database search requests and processing the search requests, querying the primary database, receiving reformatted data from the primary database, and outputting the reformatted data; at least one data archiver, coupled to the primary database, for archiving at least a portion of the data stored in the primary database according to a predetermined archiving algorithm, and for transferring archived data to an archive storage media; means for creating a master archiver; means for creating a plurality of child archivers; means for controlling said plurality of child archivers by coupling said master archiver to each one of said child archivers; means for determining an order of at least one manufacturing area to archive data file from said manufacturing area into an archriving destination; means for creating an archive protocol file for archiving said data file; means for implementing an archiving process in response to a specification from said archiving protocol file; means for executing a start-up of said archiver process; means for monitoring said child archivers to determine whether said child archivers have completed said archiving process; means for executing a shut-down of said archiving process in response to said determination that said child archivers have completed said archiving process; and means for terminating said archiving process.

BRIEF DESCRIPTION OF THE DRAWINGS

The invention may be best understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
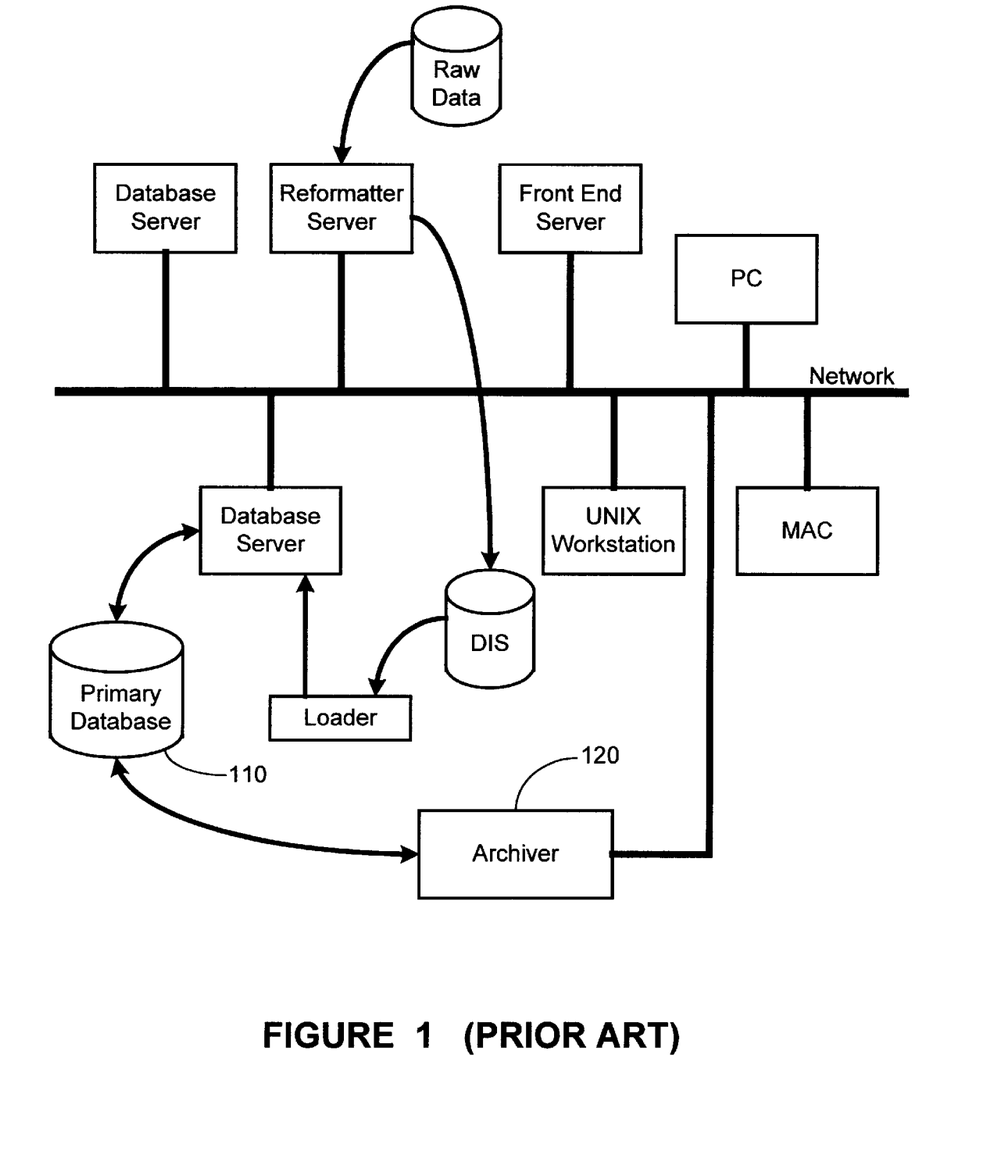
FIG. 1 illustrates a prior art means for acquiring and storing data relating to manufacturing processes.

Storing, archiving, and retrieving data is very important in the area of high-technology manufacturing, particularly in the area of semiconductor manufacturing. Scores of data files from many steps in the processes of semiconductor manufacturing are stored and archived for later retrieval. The present invention provides an apparatus and a method for archiving data in a parallel-processing manner. In one embodiment, the data that is archived is received from a data source, such as a large database. One such source is a data collecting, storing, and retrieving system that generates a primary database, such as the embodiments described in U.S. Pat. No. 5,625,816, which is hereby incorporated by reference in its entirety. FIG. 1 illustrates the prior art data collecting, storing, and retrieving system that is described by U.S. Pat. No. 5,625,816. The method and apparatus described by the present invention relates to the interaction between a primary database 110 and an archiver 120. The system described in FIG. 1 is capable of collecting data relating to process steps in manufacturing, processing the data, and archiving the processed data in an organized manner. The archiver 120 organizes and archives the processed data into the primary database 110.

Figure 2:
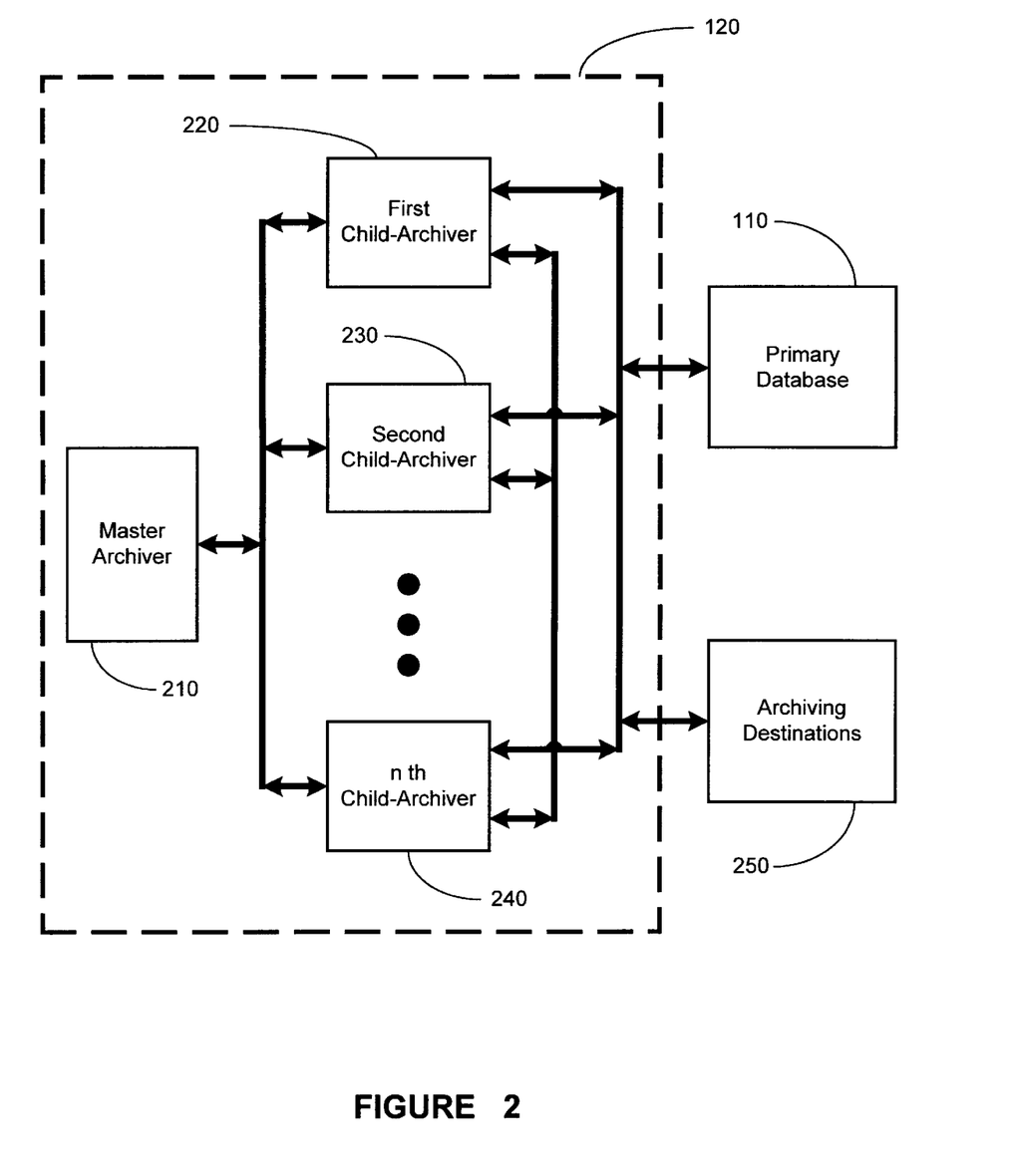
FIG. 2 depicts a block diagram of one illustrative embodiment of a parallel archiving technique as taught by the present invention.

Turning now to FIG. 2, one embodiment of an archiver 120 in a parallel processing format is illustrated. FIG. 2 also illustrates a block-diagram of the interaction between the archiver 120, the primary database 110, and the archiving destinations 250. The parallel archiving process includes a master archiver 210, a first child-archiver 220, and a second child-archiver 230 through an $n^{th}$ child-archiver 240. The master archiver 210 interfaces with the child-archivers 220, 230, 240. The master archiver 210 controls the individual archiving functions performed by the child-archivers 220, 230, 240. The child-archivers 220, 230, 240 perform the actual archiving of data. In one embodiment, the child-archivers 220, 230, 240 retrieve data from the primary database 110, and archive the data into the archiving destinations 250. The child-archivers 220, 230, 240 are also capable of retrieving data files from the archiving destinations 250 and delivering them to the primary database 110.

The child-archivers 220, 230, 240 generally function in parallel; therefore, several archiving functions can be performed simultaneously. For example, the child-archivers 220, 230, 240 can archive data files into the archiving destinations 250 simultaneously. The actual archiving of the data files from the primary database 110 to the archiving destinations 250 can be performed using one of a number of archiving methods. One such archiving method is described in U.S. patent application Ser. No. 09/225,438, filed on Jan. 5, 1999 entitled "Method and Apparatus for Parallel Processing of Data for Efficient Archiving and Retrieval of Data", and U.S. patent application Ser. No. 09/225,394, filed on Jan. 5, 1999 entitled "Method and Apparatus for Archiving and Deleting Large Data Sets", which are both hereby incorporated by reference in their entirety, and are subject to a common assignee. In one embodiment, the master archiver 210 is programmed to delegate the archiving tasks to the child-archivers 220, 230, 240. When a particular child-archiver has completed its task, or more archiving tasks are requested, the master archiver 210 is programmed to select the next available child-archiver 220, 230, 240 to perform the next archiving task. Multi-tasking of archiving processes is illustrated in more detail in FIG. 3.

Figure 3:
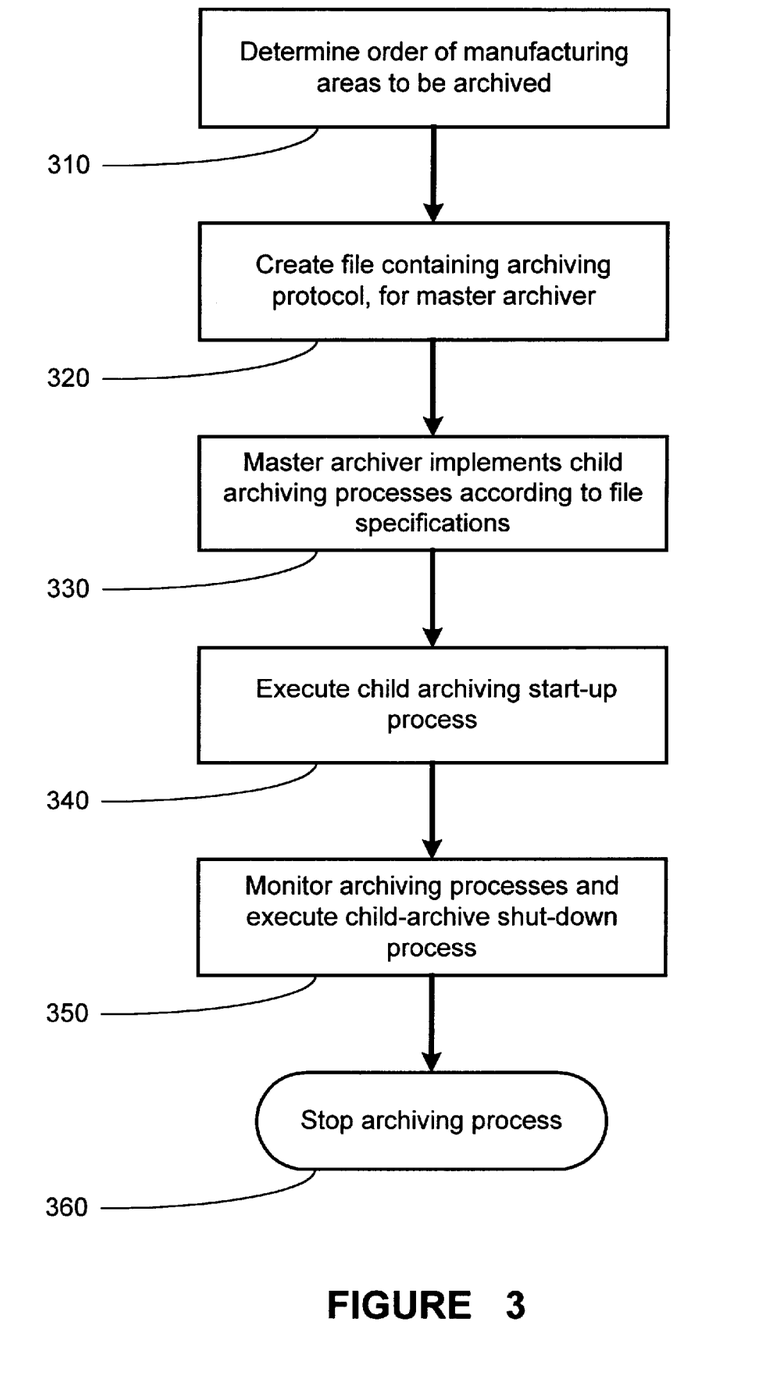
FIG. 3 depicts one illustrative embodiment of the method of the present invention, relating to parallel data archiving, depicted in a flowchart form.

Turning now to FIG. 3, one embodiment of a method for parallel format archiving of data files is illustrated. In one embodiment, the parallel archiving of data files is described in the context of semiconductor manufacturing. In one embodiment, the order of manufacturing areas that are to be archived first is determined, as described in block 310 of FIG. 3. Data files corresponding to different manufacturing areas are generally produced; these data files contain details relating to the processes of each manufacturing area. For efficient operation of the parallel archiving function, an archiving list containing the particular manufacturing areas, or locations, is important. The master archiver 210 assigns archiving tasks to the child-archivers 220, 230, 240 based upon the archiving tasks that are to be performed, as prescribed by the archiving list that contains the manufacturing area locations.

In one embodiment, the archiving list indicates a priority for data files to be archived based upon the volume of activity at the particular manufacturing areas. Generally, the data files generated by the manufacturing areas that tend to have a higher volume of activity are given priority for archiving. One of the primary reasons that high volume manufacturing areas are given priority for archiving is that these areas tend to generate more files reflecting the higher number of processes.

The archiving list also allows for the master archiver 210 to temporarily cease an archiving process at a particular manufacturing area, and revisit that area at a later time. A variety of problems can occur at a manufacturing area, preventing one of the child-archivers 220, 230, 240 from performing an archiving process in that area. For example, a manufacturing area may experience a partial process shut-down, thereby resulting in an incomplete set of data files that are slated for archiving. As another example, a block corruption for a particular manufacturing area may occur, thereby delaying the availability of data files until the block corruption is remedied. Occurrences of the preceding examples, among others, can interfere with normal archiving operations. The archiving list containing the manufacturing areas to be archived can be used to skip over problem manufacturing areas and return to them at a later time.

An archiving protocol file, containing the archiving process protocol is created and used by the master archiver 210, as described in block 320 of FIG. 3. The file described in block 320 includes a controlling script that allows the master archiver 210 to control the archiving activities of the child-archivers 220, 230, 240. As described in block 330, the master archiver 210 implements the child archiving processes in response to the specifications in the archiving protocol file described in block 320. For example, the master archiver 210 electronically wakes up when archiving is to performed, and distributes archiving tasks to the child-archivers 220, 230, 240 according to the specifications in the archiving protocol file. The master archiver 210 wakes up the child-archivers 220, 230, 240 and assigns them manufacturing areas that are to be archived. In one embodiment, a controlling script located in the archiving protocol file specifies the number of child-archivers 220, 230, 240 to be employed and the archiving file assignments for the child-archivers 220, 230, 240. The master archiver 210 executes the child-archive start-up process in order to implement the specifications in the controlling script located in the archiving protocol file, as described in block 340.

Figure 4:
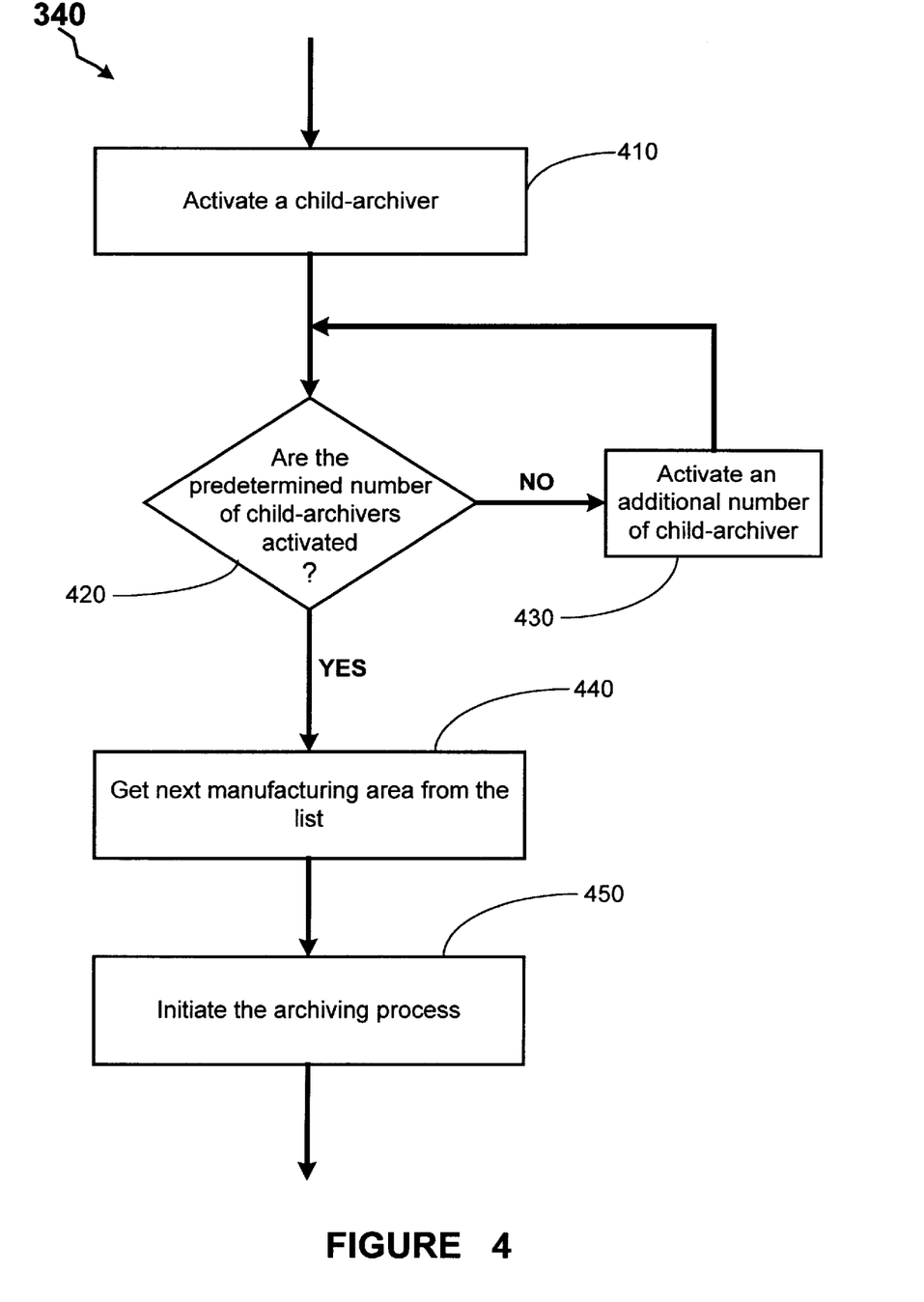
FIG. 4 depicts a more detailed illustrative embodiment of the archive start-up step (block 340) described in FIG. 3.

The child-archive start-up process, described in block 340 of FIG. 3, is illustrated in further detail in FIG. 4. The master archiver 210 activates, or electronically wakes up, one of the child-archivers 220, 230, 240, as described in block 410 of FIG. 4. The master archiver 210 then checks to determine if a predetermined number of child-archivers 220, 230, 240 are activated, as described in block 420. The master archiver 210 can be programmed to activate a predetermined number of child-archivers 220, 230, 240, depending on factors such as production volume, etc. When an archiving task that requires a large amount of processing resources is performed, a large number of child-archivers 220, 230, 240 are generally activated. If the predetermined number of child-archivers 220, 230, 240 are not yet activated, the master archiver 210 activates an additional child-archiver, as indicated in block 430. The master archiver 210 then re-checks to determine if the appropriate number of child-archivers 220, 230, 240 have been activated.

Turning now to block 440, once the predetermined number of child-archivers 220, 230, 240 are activated, the master archiver 210 retrieves the location of the manufacturing area that is to be archived next from the archiver list described in block 310 of FIG. 3. The master archiver 210 then initiates the archiving process by assigning the first manufacturing area to be archived to one of the active child-archivers 220, 230, 240 and signaling the child-archiver to begin archiving, as described in block 450 of FIG. 4. In one embodiment, the master archiver 210 is capable of assigning a manufacturing area that is to be archived to any one of the active child-archivers 220, 230, 240. For example, if there is a preference for archiving manufacturing area numbers 3, 1, and 7 in that order, the master archiver 210 can assign manufacturing area number 3 to the first child child-archiver 220, manufacturing area number 1 to the second child-archiver 230, and manufacturing area number 7 to the $n^{th}$ child-archiver 240. If the second child-archiver 230 finishes before the other child-archivers 220, 240, then the second child-archiver 230 can proceed to manufacturing area number 7 and start archiving. Once the archiving process is initiated, as described in block 450 of FIG. 4, the execution of the active child-archiver start-up process, described in block 340 of FIG. 3, is complete.

Figure 5:
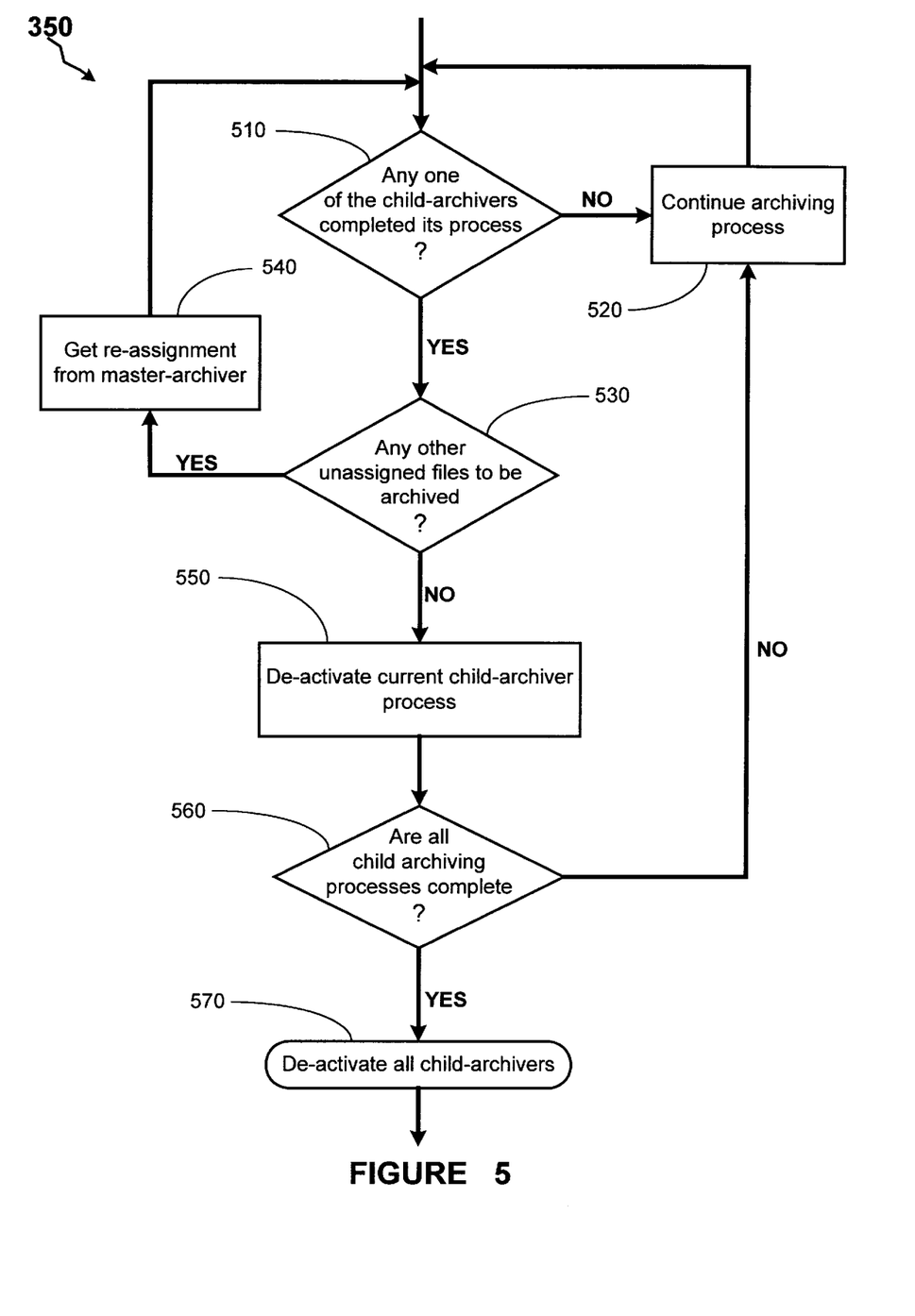
FIG. 5 depicts a more detailed illustrative embodiment of the archive shut-down step (block 350) described in FIG. 3.

Turning back to FIG. 3, once the child-archiver process start-up is executed, the master archiver 210 monitors the archiving process to determine when to execute the child-archiver shut-down process, as described in block 350. The steps of monitoring the archive process and executing the child-archiver shut-down process described in block 350 of FIG. 3, are illustrated in further detail in FIG. 5. Turning now to FIG. 5, the master archiver 210 polls the active child-archivers 220, 230, 240 to determine if any one of them has completed its respective archiving process, as described in block 510. As described in block 520, if the master archiver 210 determines that none of the active child-archivers 220, 230, 240 completed their respective archiving tasks, the archiver processes are continued, and the master archiver 210 continues to monitor for the termination of an archiver process.

When any one of the active child-archivers 220, 230, 240 has completed its respective archiving task, the master archiver 210 determines if there are any other files that are to be archived, and have not been assigned to one of the child-archivers 220, 230, 240, as described in block 530. In one embodiment, the master archiver 210 checks the controlling script in the archiving protocol file (described in block 320 of FIG. 3) to make the determination if there exists an unassigned file that is to be archived. When the master archiver 210 determines that there is an unassigned file ready to be archived, the master archiver 210 modifies the controlling script and assigns the file to the child-archiver 220, 230, 240 that had completed its archiving task, as described in block 540. Once re-assignment of the child-archiver 220, 230, 240 is complete, the master archiver 210 then monitors the child-archivers 220, 230, 240 for the next completion of an archiving task.

Once a child-archiver 220, 230, 240 has completed an archiving task (block 510), and there are no unassigned files that need to be archived (block 530), the master archiver 210 de-activates that child-archiver 220, 230, 240, as described in block 550. Due to the parallel format in which one embodiment of the present invention is employed (see FIG. 2), any one of the child-archivers 220, 230, 240 can be de-activated, and the remaining child-archivers 220, 230,

240 can continue to be fully operational. Therefore, when the master archiver 210 de-activates one of the child-archivers 220, 230, 240, the others may continue performing archiving tasks, as specified in the controlling script in the archiving protocol file. The master archiver 210 polls the currently active child-archivers 220, 230, 240 to determine whether all of the child-archiving processes are complete, as described in block 560 of FIG. 5.

When the master archiver 210 determines that all of the child-archiving processes are not complete, the master archiver 210 continues the archiving processes and monitors the child-archivers 220, 230, 240 for the next termination of a child-archiver process, which is illustrated by the path from block 560 to block 520, to block 510. The master archiver 210 will again check to determine whether any new data files that are slated to be archived have been added to the controlling script (block 530). If a new data file has been added to the controlling script, the master archiver 210 will assign the file to one of the available child-archivers 220, 230, 240. When the master archiver 210 determines that no new files have been added to the controlling script, it de-activates the current child-archiver 220, 230, 240.

Referring back to block 560 in FIG. 5, when the master archiver 210 determines that all of the child-archiving processes are complete, the master archiver 210 interprets this determination to indicate that all of the archiving tasks specified in the controlling script have been performed. The master archiver 210 then de-activates all of the remaining active child-archivers 220, 230, 240, as described in block 570. The de-activation of the child-archivers 220, 230, 240 completes the child-archiving shut-down process described in block 350 of FIG. 3. The archive process is then stopped, as described in block 360 of FIG. 3. In one embodiment, the archiving process can be re-initiated upon a determination by the master archiver 210 that a new data file has been added to the controlling script in the archiving protocol file. Upon the re-initiation of the archiving process, the master archiver 210 repeats the entire archiving process as described in FIGS. 3, 4 and 5.

The archiving process taught by the present invention is applicable to not only semiconductor manufacturing, but to other types of manufacturing processes as well. The archiving process is also applicable to processing of various types of data files. The archiving process described by the present invention can be used with other types of archiving processes and data manipulation techniques.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for archiving data files in a system having a master archiver and a plurality of child archivers, comprising:

controlling said plurality of child archivers by coupling said master archiver to each one of said child archivers;

determining an order of at least one manufacturing area to archive data files from said manufacturing area into an archiving destination;

creating an archive protocol file for archiving said data file;

implementing an archiving process in response to a specification from said archiving protocol file;

executing a start-up of said archiver process;

monitoring said child archivers to determine whether said child archivers have completed said archiving process;

executing a shut-down of said archiving process in response to said determination that said child archivers have completed said archiving process; and terminating said archiving process.

2. The method as described in claim 1, wherein controlling said plurality of child archivers by coupling said master archiver to each one of said child archivers further comprises arranging said plurality of child archivers in a parallel format in relation to said master archiver.

3. The method as described in claim 1, wherein determining an order of at least one manufacturing area further comprises creating an archiving list.

4. The method as described in claim 3, wherein creating an archiving list further comprises creating an archiving list that comprises a location of said manufacturing area and an archiving priority list.

5. The method as described in claim 1, wherein creating an archiving protocol file for archiving said data file further comprises creating a controlling script.

6. The method as described in claim 5, wherein creating a controlling script further comprises creating a controlling script that comprises the number of said child archivers to be employed and a file-assignment that assigns said file to be archived to at least one of said child archivers.

7. The method as described in claim 1, wherein executing a start-up of said archiver process further comprises:

activating at least one of said child archivers;

determining whether there are a predetermined number of said child archivers that are activated;

activating an additional said child archiver in response to said determination that a predetermined number of said child archivers have not been activated;

retrieving next said manufacturing area from said archiving list in response to said determination that a predetermined number of said child archivers have been activated; and initiating said archiving process on said activated child archivers.

8. The method as described in claim 7, wherein activating said child archiver further comprises electronically waking up said child archiver.

9. The method as described in claim 7, wherein determining whether there are a predetermined number of said child archivers that are activated further comprises programming said master archiver to activate a predetermined number of child archivers based upon manufacturing factors comprising production volume and number of files to be archived.

10. The method as described in claim 1, wherein monitoring said child archivers and executing a shut-down of said archiver process further comprises:

determining whether any one of said child archivers have completed its said respective archiving processes;

continuing said archiving process in response to said determination that at least one of said child archivers has not completed its respective archiving process;

determining whether there exists any unassigned files to be archived in response to said determination that at least one of said child archivers has completed its respective archiving process;

reassigning said unassigned file to be archived to said child archiver that has completed its archiving process, in response to said determination that there exists at least one said unassigned file to be archived;

de-activating said child archiver that has completed its archiving process in response to said determination that are no said unassigned file to be archived;

determining whether said archiving processes of all active child archivers are complete;

continuing archiving processes of all said active child archivers in response to a determination that said archiving processes of all active child archivers are not complete; and de-activating all said child archivers in response to a determination that said archiving processes of all active child archivers are complete.

11. The method as described in claim 10, wherein determining whether any one of said child archivers have completed its said respective archiving processes further comprises polling all said active child archivers to determine their respective status.

12. The method as described in claim 10, wherein determining whether there exists any unassigned files to be archived further comprises searching said archiving protocol file for said unassigned files to be archived.

13. The method as described in claim 10, wherein reassigning said unassigned file to be archived to said child archiver that has completed its archiving process further comprises modifying said archiving protocol file to assign said unassigned file to be archived.

14. The method as described in claim 10, wherein determining whether said archiving processes of all active child archivers are complete further comprises polling said active child archivers to check their respective status.

15. An apparatus for archiving data files in a system having a master archiver and a plurality of child archivers, comprising:

means for controlling said plurality of child archivers by coupling said master archiver to each one of said child archivers;

means for determining an order of at least one manufacturing area to archive data file from said manufacturing area into an archriving destination;

means for creating an archive protocol file for archiving said data file;

means for implementing an archiving process in response to a specification from said archiving protocol file;

means for executing a start-up of said archiver process;

means for monitoring said child archivers to determine whether said child archivers have completed said archiving process;

means for executing a shut-down of said archiving process in response to said determination that said child archivers have completed said archiving process; and means for terminating said archiving process.

16. A system for storing, archiving, and retrieving data, comprising:

a network for transmitting and receiving data;

at least one input system, coupled to said network, for inputting data in at least a first format;

a reformatter, coupled to said network, for receiving said data and reformatting said data into a predetermined format to produce reformatted data;

a primary database, coupled to said network, for storing said reformatted data;

a loader, coupled to said primary database, for loading said reformatted data into said primary database;

at least one client workstation, coupled to said network, for receiving data search requests;

a front end server, coupled to said network, for receiving said primary database search requests and processing said search requests, querying said primary database, receiving reformatted data from said primary database, and outputting said reformatted data;

at least one data archiver, coupled to said primary database, for archiving at least a portion of the data stored in said primary database according to a predetermined archiving algorithm, and for transferring archived data to an archive storage media;

means for creating a master archiver;

means for creating a plurality of child archivers;

means for controlling said plurality of child archivers by coupling said master archiver to each one of said child archivers;

means for determining an order of at least one manufacturing area to archive data file from said manufacturing area into an archriving destination;

means for creating an archive protocol file for archiving said data file;

means for implementing an archiving process in response to a specification from said archiving protocol file;

means for executing a start-up of said archiver process;

means for monitoring said child archivers to determine whether said child archivers have completed said archiving process;

means for executing a shut-down of said archiving process in response to said determination that said child archivers have completed said archiving process; and means for terminating said archiving process.

17. A computer program for archiving data files in a system having a master archiver and a plurality of child archivers, comprising the steps of:

controlling said plurality of child archivers by coupling said master archiver to each one of said child archivers;

determining an order of at least one manufacturing area to archive data files from said manufacturing area into an archiving destination;

creating an archive protocol file for archiving said data file;

implementing an archiving process in response to a specification from said archiving protocol file;

executing a start-up of said archiver process;

monitoring said child archivers to determine whether said child archivers have completed said archiving process;

executing a shut-down of said archiving process in response to said determination that said child archivers have completed said archiving process; and terminating said archiving process.

18. The computer program described in claim 17, wherein said step of controlling said plurality of child archivers by coupling said master archiver to each one of said child archivers comprises arranging said plurality of child archivers in a parallel format in relation to said master archiver.

19. The computer program described in claim 17, wherein said step of determining an order of at least one manufacturing area further comprises creating an archiving list.

20. The computer program described in claim 19, wherein said step of creating an archiving list further comprises creating an archiving list that comprises a location of said manufacturing area and an archiving priority list.

21. The computer program described in claim 17, wherein said step of creating an archiving protocol file for archiving said data file further comprises creating a controlling script.

22. The computer program described in claim 21, wherein said step of creating a controlling script further comprises creating a controlling script that comprises the number of said child archivers to be employed and a file-assignment that assigns said file to be archived to at least one of said child archivers.

23. The computer program described in claim 17, wherein said step of executing a start-up of said archiver process further comprises the steps of:

activating at least one of said child archivers;

determining whether there are a predetermined number of said child archivers that are activated;

activating an additional said child archiver in response to said determination that a predetermined number of said child archivers have not been activated;

retrieving next said manufacturing area from said archiving list in response to said determination that a predetermined number of said child archivers have been activated; and initiating said archiving process on said activated child archivers.

24. The computer program described in claim 23, wherein said step of activating said child archiver further comprises electronically waking up said child archiver.

25. The computer program described in claim 23, wherein said step of determining whether there are a predetermined number of said child archivers that are activated further comprises programming said master archiver to activate a predetermined number of child archivers based upon manufacturing factors comprising production volume and number of files to be archived.

26. The computer program described in claim 17, wherein said step of monitoring said child archivers and executing a shut-down of said archiver process further comprises the steps of:

determining whether any one of said child archivers have completed its said respective archiving processes;

continuing said archiving process in response to said determination that at least one of said child archivers has not completed its respective archiving process;

determining whether there exists any unassigned files to be archived in response to said determination that at least one of said child archivers has completed its respective archiving process;

reassigning said unassigned file to be archived to said child archiver that has completed its archiving process, in response to said determination that there exists at least one said unassigned file to be archived;

de-activating said child archiver that has completed its archiving process in response to said determination that are no said unassigned file to be archived;

determining whether said archiving processes of all active child archivers are complete;

continuing archiving processes of all said active child archivers in response to a determination that said archiving processes of all active child archivers are not complete; and de-activating all said child archivers in response to a determination that said archiving processes of all active child archivers are complete.

27. The computer program described in claim 26, wherein said step of determining whether any one of said child archivers have completed its said respective archiving processes further comprises polling all said active child archivers to determine their respective status.

28. The computer program described in claim 26, wherein said step of determining whether there exists any unassigned files to be archived further comprises searching said archiving protocol file for said unassigned files to be archived.

29. The computer program described in claim 26, wherein said step of reassigning said unassigned file to be archived to said child archiver that has completed its archiving process further comprises modifying said archiving protocol file to assign said unassigned file to be archived.

30. The computer program described in claim 26, wherein said step of determining whether said archiving processes of all active child archivers are complete further comprises polling said active child archivers to check their respective status.

* * * * *